(12) United States Patent
Li (10) Patent No.: US 12,081,016 B2
(45) Date of Patent: Sep. 3, 2024

(54) EFUSE CIRCUIT AND CONTROL METHOD THEREOF

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 194 days.

(21) Appl. No.: 17/886,180

(22) Filed: Aug. 11, 2022

(65) Prior Publication Data

US 2023/0065848 A1 Mar. 2, 2023

(30) Foreign Application Priority Data

Aug. 27, 2021 (CN) .......................... 202111000585.3

(51) Int. Cl.
*H02H 7/12* (2006.01)
*H02H 1/00* (2006.01)

(52) U.S. Cl.
CPC ............ *H02H 7/12* (2013.01); *H02H 1/0007* (2013.01)

(58) Field of Classification Search
CPC .......... H02H 7/12; H02H 1/0007; H02H 9/04; H02H 9/025
USPC ....................................................... 361/91.1
See application file for complete search history.

(56) References Cited

U.S. PATENT DOCUMENTS

| 6,400,203 | B1* | 6/2002 | Bezzi | ................ | H03K 17/0822 |
| | | | | | 327/309 |
| 9,525,273 | B1* | 12/2016 | Yamamoto | .............. | H01T 15/00 |
| 11,955,478 | B2* | 4/2024 | Arnold | ................. | H01L 29/861 |
| 2015/0041849 | A1* | 2/2015 | Gillberg | ................. | F02P 9/005 |
| | | | | | 257/140 |
| 2016/0036432 | A1* | 2/2016 | Dhamdhere | ........... | G05F 1/595 |
| | | | | | 327/434 |
| 2017/0141545 | A1* | 5/2017 | Yamamoto | ............ | F02P 3/0435 |
| 2017/0187282 | A1* | 6/2017 | Wang | ...................... | H02M 1/12 |
| 2017/0338737 | A1* | 11/2017 | Kohama | ............... | H02M 3/156 |
| 2018/0131196 | A1* | 5/2018 | Gong | ........................ | H02J 7/04 |
| 2018/0294646 | A1* | 10/2018 | Simonson | ............. | H02H 9/004 |
| 2020/0287538 | A1* | 9/2020 | Kohama | ........... | H03K 17/0828 |
| 2022/0206519 | A1* | 6/2022 | Zhong | ..................... | G05F 1/461 |

FOREIGN PATENT DOCUMENTS

| CN | 113098469 A | * | 7/2021 | ............ | H03K 17/56 |
| EP | 3070324 A1 | * | 9/2016 | ............ | F02P 3/0442 |

* cited by examiner

*Primary Examiner* — Dharti H Patel
(74) *Attorney, Agent, or Firm* — Perkins Coie LLP (57) ABSTRACT

A method for controlling an efuse circuit is provided. The method includes the following steps. A sample signal of a switch is provided. An error signal is generated according to the sample signal and a reference signal. The error signal is compared with a threshold. A voltage across a control node of the switch and an output node of the switch is clamped to a preset voltage value when the error signal is greater than the threshold.

20 Claims, 6 Drawing Sheets

FIG. 1

(Prior Art)

EFUSE CIRCUIT AND CONTROL METHOD THEREOF

CROSS-REFERENCE TO RELATED APPLICATION(S)

The present application claims the benefit of and priority to a China Patent Application Serial No. 202111000585.3 filed Aug. 27, 2021, which is hereby incorporated fully by reference into the present application.

TECHNICAL FIELD

The present invention relates generally to electronic circuits, and more particularly but not exclusively to an efuse circuit.

BACKGROUND

Figure 1:
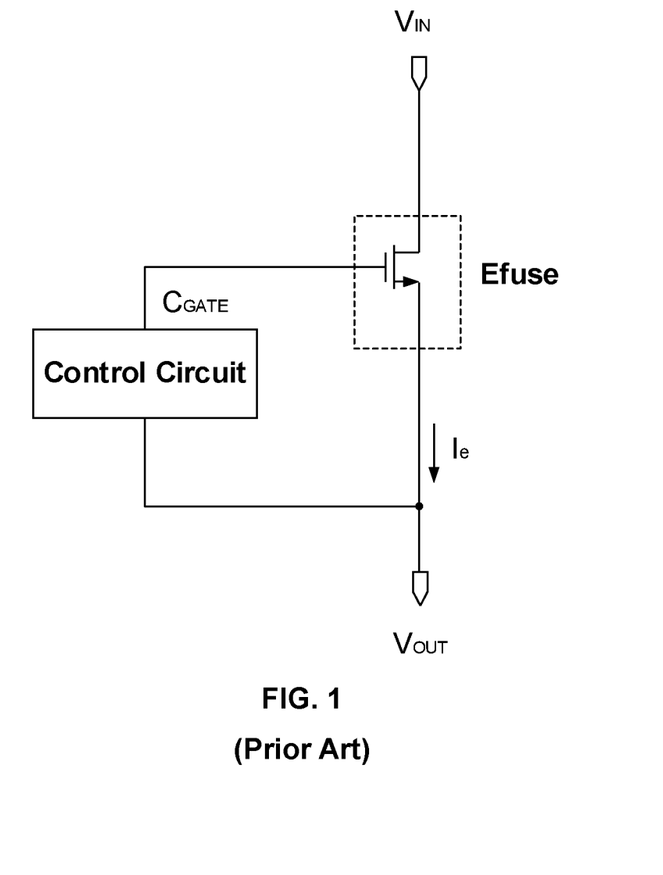
FIG. 1 shows a circuit diagram of a conventional efuse circuit.

For efuse applications, an efuse is applied to protect an electrical circuit. Specifically, when an over-current event or an over-voltage event occurs, the efuse will decrease the current flowing through a system or decrease the voltage of the system. FIG. 1 shows a circuit diagram of a conventional efuse circuit. As shown in FIG. 1, an efuse switch is coupled between two nodes of a system. A control circuit receives a current signal $I_e$ flowing through the efuse switch, and generates a control signal $C_{GATE}$ according to the current signal $I_e$ to control the efuse switch via the control node of the efuse switch. When the current flowing through the efuse switch is normal, the efuse switch is fully turned on. On the other hand, when an over-current event or an over-voltage event occurs, the control circuit provides a lower $V_{GS}$ voltage to the efuse switch so as to increase the drain-source on-resistance of the efuse switch, thereby decreases the current flowing through the efuse switch or decreases an output voltage of the efuse switch.

However, under certain applications, the efuse switch could not be shut down immediately after the over-current event occurs, and due to the control loop requires a longer time to regulate the current flowing through the efuse switch to a target value, the efuse switch may experience current overload. Therefore, it is desired to propose a way to quickly reduce the current flowing through the efuse switch when an over-current event occurs.

SUMMARY

According to an embodiment of the present invention, an efuse circuit is provided. The efuse circuit includes a switch, a sample circuit, a closed-loop control circuit, and a pull-down circuit. The switch has an input node, an output node, and a control node. The sample circuit is configured to provide a sample signal of the switch. The closed-loop control circuit is configured to receive the sample signal, and generate an error signal according to the sample signal. The pull-down circuit has a first node, a second node, and a third node, where first node of the pull-down circuit is configured to receive the error signal, the second node of which is coupled to the control node of the switch, and the third node of which is coupled to the output node of the switch. The pull-down circuit is further configured to clamp a voltage across the control node of the switch and the output node of the switch to a preset voltage value when the error signal is greater than a threshold.

According to an embodiment of the present invention, a method for controlling an efuse circuit is provided. The method includes the following steps. A sample signal of a switch is provided. An error signal is generated according to the sample signal and a reference signal. The error signal is compared with a threshold. A voltage across a control node of the switch and an output node of the switch is clamped to a preset voltage value when the error signal is greater than the threshold.

BRIEF DESCRIPTION OF THE DRAWINGS

The present invention can be further understood with reference to following detailed description and appended drawings, wherein like elements are provided with like reference numerals. These drawings are only for illustration purpose, thus may only show part of the devices and are not necessarily drawn to scale.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the phrases "in one embodiment", "in some embodiments", "in one implementation", and "in some implementations" as used includes both combinations and sub-combinations of various features described herein as well as variations and modifications thereof. These phrases used herein does not necessarily refer to the same embodiment, although it may. Those skilled in the art should understand that the meanings of the terms identified above do not necessarily limit the terms, but merely provide illustrative examples for the terms. It is noted that when an element is "connected to" or "coupled to" the other element, it means that the element is directly connected to or coupled to the other element, or indirectly connected to or coupled to the other element via another element. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 2:
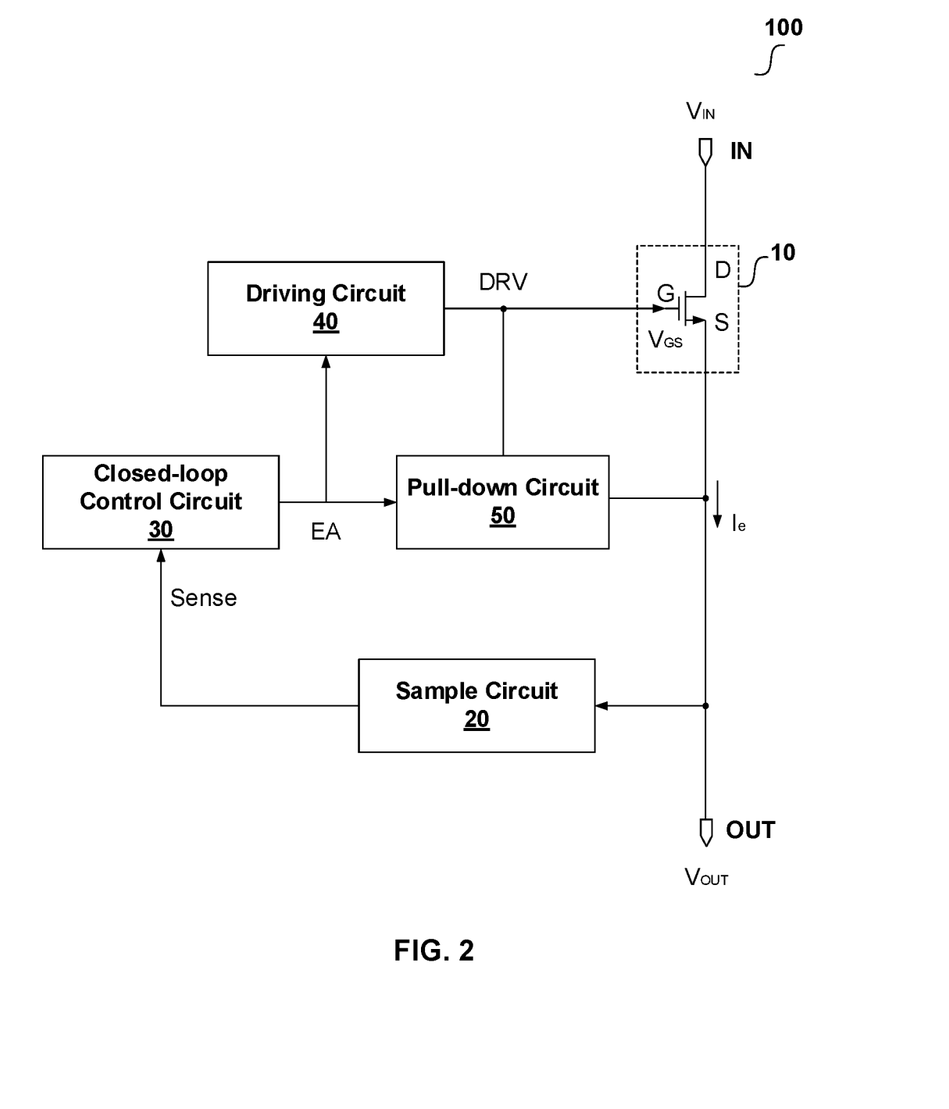
FIG. 2 is a schematic block diagram of an efuse circuit 100 in accordance with one embodiment of the present invention.

FIG. 2 is a schematic block diagram of an efuse circuit 100 in accordance with one embodiment of the present invention. As shown in FIG. 2, the efuse circuit 100 includes a switch 10, a sample circuit 20, a closed-loop control circuit 30, a driving circuit 40, and a pull-down circuit 50.

In one embodiment as shown in FIG. 2, the switch 10 is coupled between a system input node IN (for receiving an input voltage signal, e.g., $V_{IN}$) and a system output node OUT (for providing an output voltage signal, e.g., $V_{OUT}$). The current signal $I_e$ flows from the system input node IN to the system output node OUT via the switch 10. In one embodiment, the switch 10 is coupled to an input node of a switching converter. That is, the system input node IN may include or be coupled to an output node of a power supply for receiving a power supply voltage signal from the power supply, while the system output node OUT may include or be coupled to the input node of the switching converter for providing the power supply voltage signal to the switching converter. In another embodiment, the switch 10 is coupled to an output node of a switching converter, in other words, the system input node IN may include or be coupled to an output node of the switching converter for receiving an output voltage signal from the switching converter, while the system output node OUT may include or be coupled to an input node of a load for providing the output voltage signal to the load. It is well understood by person having ordinary skills in the art that the system input node IN and the system output node OUT may include or be coupled to any elements, devices, circuits, or nodes of system that requires protection. The switch 10 includes an input node, an output node, and a control node. Specifically, the input node of the switch 10 is coupled to the system input node IN, and the output node of the switch 10 is coupled to the system output node OUT. In one embodiment as shown in FIG. 2, the switch 10 is realized by a N-type Metal-Oxide-Semiconductor Field Effect Transistor (MOSFET), which includes a source S, a drain D, and a gate G, where the input node of the switch 10 is the source S of the N-type MOSFET, the output node of which is the drain D of the N-type MOSFET, and the control node of which is the gate of the N-type MOSFET. It is noted that the switch 10 could be realized by any suitable controllable switch device, such as, a P-type MOSFET, an Insulated Gate Bipolar Transistor (IGBT), a Junction Gate Field-Effect Transistor (JFET).

In one embodiment as shown in FIG. 2, the sample circuit 20 is configured to provide a sample signal Sense of the switch 10. In one embodiment, the sample circuit 20 is a current sample circuit configured to sample a current Ie flowing through the switch 10. In this case, the sample signal Sense represents the current Ie flowing through the switch 10. In another embodiment, the sample circuit 20 is a voltage sample circuit configured to sample an input voltage signal $V_{IN}$ of the input node of the switch 10. Thus, the sample signal Sense represents the input voltage signal $V_{IN}$ received from the input node of the switch 10.

In one embodiment as shown in FIG. 2, the closed-loop control circuit 30 is coupled to the sample circuit 20 to receive the sample signal Sense, and is configured to generate an error signal EA according to the sample signal Sense. In one embodiment, the closed-loop control circuit 30 is configured to compare the sample signal Sense with a reference signal, and generate the error signal EA by amplifying the difference between the sample signal Sense and the reference signal. In one embodiment, the error signal EA represents a difference between the current flowing through the switch 10 and the desired current value. In another embodiment, the error signal EA represents a difference between the input voltage signal $V_{IN}$ received from the input node of the switch 10 and the desired input voltage value. In one implementation, the error signal EA is a voltage signal. In some implementations, the error signal EA is a current signal.

The driving circuit 40 is configured to receive the error signal EA, and generate a driving signal DRV according to the error signal EA, and the driving signal DRV is provided to the control node of the switch 10. In one embodiment, the driving signal DRV is a voltage signal, and the value of the driving signal DRV is adjusted according to the value of the error signal EA. The driving circuit 40 is configured to adjust a voltage across the gate G and the source S (i.e., $V_{GS}$) according to the value of the driving signal DRV, thereby fully turning on the switch 10 and/or adjusting the drain-source on-resistance (i.e., $R_{DS(on)}$) of the switch 10.

The pull-down circuit 50 includes a first node, a second node, and a third node. The first node of the pull-down circuit 50 is coupled to the closed-loop control circuit 30 for receiving the error signal EA, the second node of which is coupled to the control node of the switch 10, and the third node of which is coupled to the output node of the switch 10. In one embodiment, the pull-down circuit 50 is configured to compare the error signal EA with a threshold (e.g., an over-current threshold or an over-voltage threshold). When the error signal EA is greater than the threshold, the pull-down circuit 50 provides a conduction path from the control node of the switch 10 to the output node of the switch 10, and adjusts the current flowing through the control node of the switch 10 to the output node of the switch 10 based on the error signal EA, thereby clamping the $V_{GS}$ voltage to a preset voltage value. In one embodiment, the preset voltage value is greater than the conduction threshold $V_{GS(TH)}$ of the switch 10. In another embodiment, the preset voltage value is an adaptive voltage value relative to the device parameters of the switch 10. In one implementation, the adaptive voltage value is relative to the maximum allowable current Imax flowing through the switch 10. In another implementation, the preset voltage value is the $V_{GS}$ value corresponding to the maximum allowable current Imax flows through the switch 10. That is, when the error signal EA is greater than the threshold, the $V_{GS}$ voltage will be clamped at the $V_{GS}$ value corresponding to the maximum allowable current Imax flows through the switch 10 so as to ensure that the current flowing through the switch 10 does not exceeds the maximum allowable current Imax. In one embodiment, the preset voltage value is 1.4V. Based on the above, the control circuit 100 limits the current flowing through the switch 10 and provides protection to the switch 10, and thus provides protection to the switching converter or any elements, devices, circuits, or nodes of system coupled to the switch 10.

In one embodiment, the control circuit 100 is integrated with a controller for a switching converter. The switching converter may include any topology of converter circuits such as Buck, Boost, Buck-Boost, and Flyback. In another embodiment, the control circuit 100 is separated from the controller for a switching converter.

Figure 3:
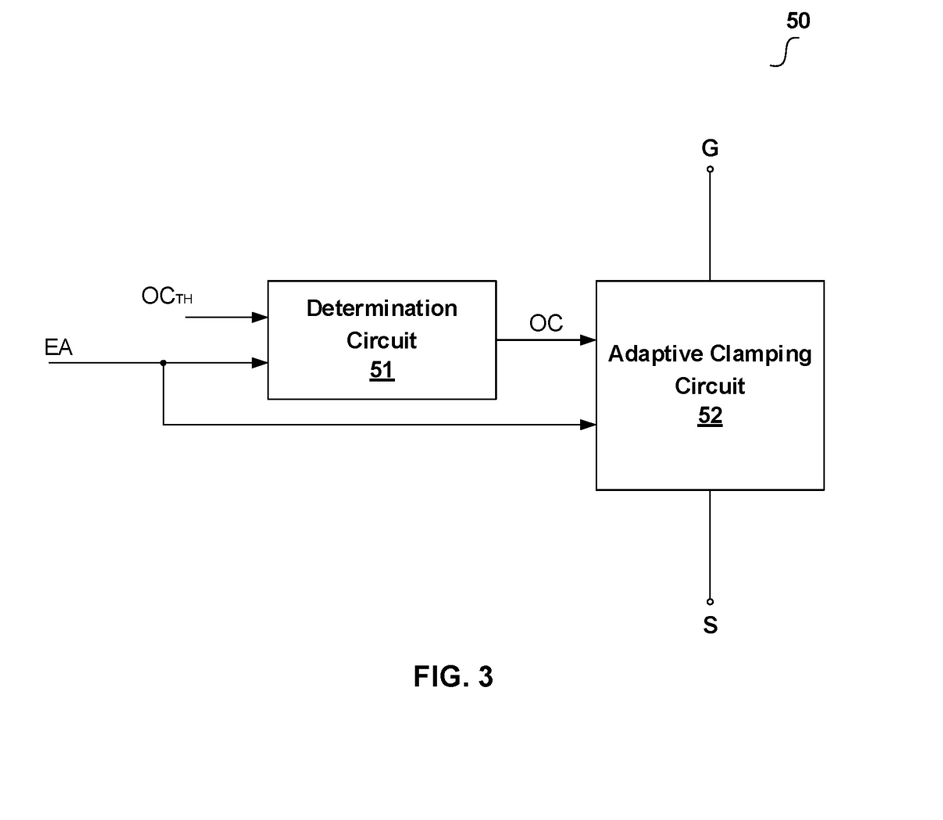
FIG. 3 is a schematic block diagram of a pull-down circuit 50 in accordance with one embodiment of the present invention.

FIG. 3 is a schematic block diagram of a pull-down circuit 50 in accordance with one embodiment of the present invention. As shown in FIG. 3, the pull-down circuit 50 includes a determination circuit 51 and an adaptive clamping circuit 52. The determination circuit 51 is configured to receive the error signal EA, compare the error signal EA with a threshold (e.g., an over-current threshold $OC_{TH}$ or an over-voltage threshold), and generate a pull-down signal OC (e.g., an over-current signal or an over-voltage signal). In one embodiment, when the error signal EA is greater than the threshold, the pull-down signal OC is enabled; while when the error signal EA is less than the threshold $OC_{TH}$, the pull-down signal OC is disabled. In one embodiment, the pull-down signal OC is a logic signal having a high voltage level or a low voltage level. In one embodiment, the enabled pull-down signal OC is at a high voltage level, while the disabled pull-down signal OC is at a low voltage level.

The adaptive clamping circuit 52 includes a first node, a second node, a third node, and a fourth node. The first node of the adaptive clamping circuit 52 is configured to receive the pull-down signal OC, the second node of which is configured to receive the error signal EA, the third node of which is coupled to the control node (e.g., gate G) of the switch 10, and the fourth node of which is coupled to the output node (e.g., source S) of the switch 10. When the pull-down signal OC is enabled, the adaptive clamping circuit 52 clamps the voltage across the third node and the fourth node of which (i.e., $V_{GS}$) to the preset voltage value based on the error signal EA. In one embodiment, the adaptive clamping circuit 52 keeps the current flowing through the third node and the fourth node constant based on the error signal EA, thereby clamping the voltage across the third node and the fourth node of which (i.e., $V_{GS}$) to the preset voltage value. In another embodiment, the adaptive clamping circuit 52 provides a discharging current path from the control node (e.g., gate G) of the switch 10 to a logic ground, where the current flowing through the discharging current path is controlled by the error signal EA. In one embodiment, the greater the error signal EA is, the greater the current flowing through the discharging current path.

Figure 4:
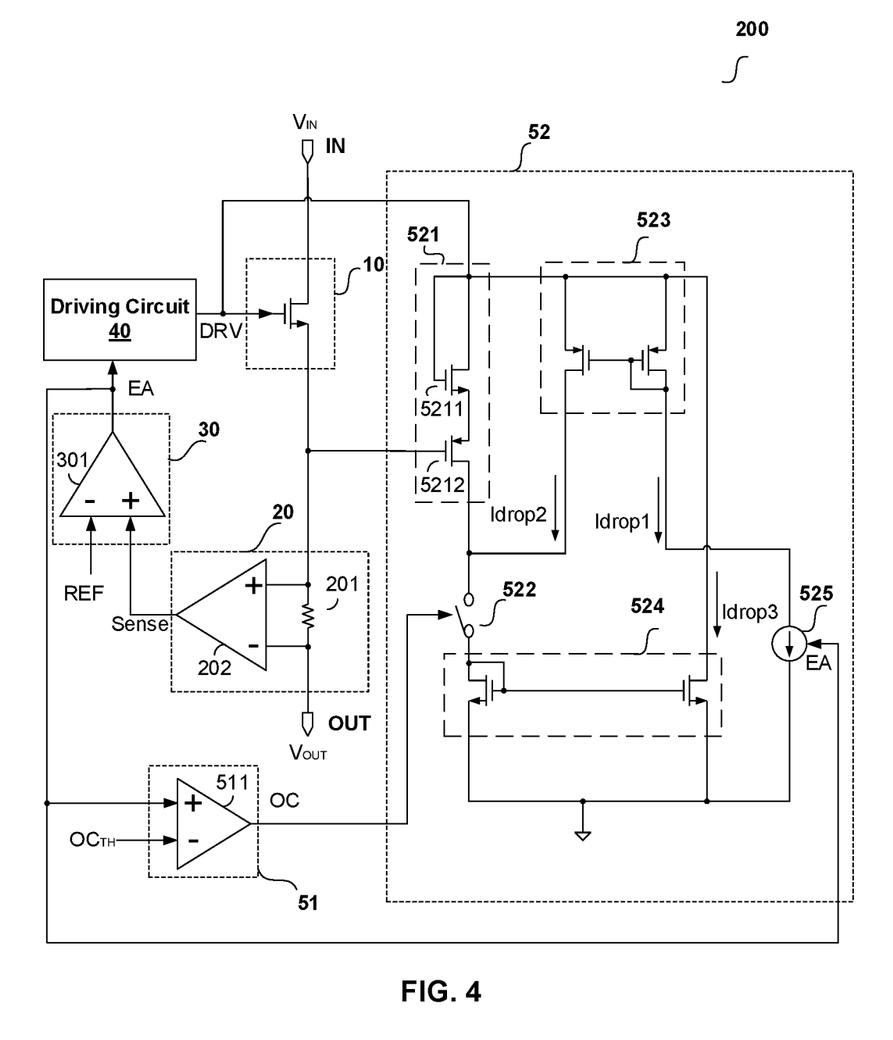
FIG. 4 is a schematic circuit diagram of an efuse circuit 200 in accordance with one embodiment of the present invention.

FIG. 4 is a schematic circuit diagram of an efuse circuit 200 in accordance with one embodiment of the present invention. In one embodiment as shown in FIG. 4, the sample circuit 20 is realized by a current sample circuit. It is understood by person having ordinary skills in the art that, in some embodiments, the sample circuit 20 could be realized by any suitable voltage sample circuit configured to sample the input voltage signal $V_{IN}$ of the switch 10. As shown in FIG. 4, the sample circuit 20 includes a sample resistor 201 and an operational amplifier 202. Specifically, the sample resistor 201 is serially connected between the output node of the switch 10 and the system output node OUT. The operational amplifier 202 has an input node, an second input node, and an output node, where the first input node and the second input node of the operational amplifier 202 is respectively coupled to a first node and a second node of the sample resistor 201, and the output node of the operational amplifier 202 provides the sample signal Sense representing the current Ie flowing through the switch 10. In some other embodiments, instead of the sample resistor 201, a transistor connected in parallel with the switch 10 is used to sense the current Ie flowing through the switch 10.

In one embodiment as shown in FIG. 4, the closed-loop control circuit 30 is realized by an error amplifier 301. The error amplifier 301 has a first input node, a second input node, and an output node. The first input node of the error amplifier 301 is configured to receive the sample signal Sense, the second input node of which is configured to receive a reference signal REF, and the error amplifier 301 is configured to compare the sample signal Sense with the reference signal REF and generate the error signal EA by amplifying the error between the sample signal Sense and the reference signal REF.

In one embodiment as shown in FIG. 4, the determination circuit 51 is realized by a comparator 511. The comparator 511 has a first input node, a second input node, and an output node. The first input node of the comparator 511 is configured to receive the error signal EA, the second node of which is configured to receive the threshold $OC_{TH}$, and the comparator 511 is configured to compare the error signal EA with the threshold $OC_{TH}$ and generate the pull-down signal OC. In one embodiment as shown in FIG. 4, when the error signal EA is greater than the threshold $OC_{TH}$, the pull-down signal OC is enabled (e.g., at a high voltage level).

In one embodiment as shown in FIG. 4, the adaptive clamping circuit 52 includes a preset voltage generation circuit 521, a clamping switch 522, a first current mirror circuit 523, a second current mirror circuit 524, and a controllable current source 525.

The preset voltage generation circuit 521 includes a first node, a second node, and a third node, where the first node of which is coupled to the control node of the switch 10, the second node of which is coupled to the output node of the switch, and the third node of which is coupled to the first node of the clamping switch 522.

The clamping switch 522 has a first node, a second node, and a control node, where the first node of which is coupled to the third node of the preset voltage generation circuit 521, the second node of which is coupled to the second node of the second current mirror circuit 524, and the control node of which is configured to receive the pull-down signal OC.

The first current mirror circuit 523 includes a first node, a second node, and a third node, where the first node of which is coupled to the control node of the switch 10, the second node of which is coupled to the logic ground via the controllable current source 525, and the third node of which is coupled to the first node of the clamping switch 522. The controllable current source 525 is controlled by the error signal EA. In one embodiment, when the current Ie flowing through the switch 10 is larger, the error signal EA is greater, and a first current signal Idrop1 generated by the controllable current source 525 is also greater.

The second current mirror circuit 524 includes a first node, a second node, and a third node, where the first node of which is coupled to the control node of the switch 10, the second node of which is coupled to the second node of the clamping switch 522, and the third node of which is coupled to the logic ground.

The control node of the clamping switch 522 is configured to receive the pull-down signal OC. In one embodiment, when the pull-down signal OC is enabled, the clamping switch 522 is turned on, and therefore the control node of the switch 10 is connected to the output node of the switch 10 through the preset voltage generation circuit 521. The controllable current source 525 generates the first current signal Idrop1 at the second node of the first current mirror circuit 523. The first current mirror circuit 523 provides a second current signal Idrop2, proportional to the first current signal Idrop1, at the third node of the first current mirror circuit 523. The second current mirror circuit 524 provides a third current signal Idrop3, proportional to the second current signal Idrop2, at the first node of the second current mirror circuit 524. In one embodiment, as the current signal $I_e$ flowing through the switch 10 is larger, the third current signal Idrop3 is also greater, and thus the voltage across the control node of the switch 10 and the output node of the switch 10 is maintained at the preset voltage value by discharging the $V_{GS}$ of the switch 10. In another embodiment, when the input voltage signal $V_{IN}$ of the switch 10 is higher, the third current signal Idrop3 is also greater, and thus the voltage across the control node of the switch 10 and the output node of the switch 10 is maintained at the preset voltage value by discharging the $V_{GS}$ of the switch 10.

In one embodiment as shown in FIG. 4, the preset voltage generation circuit 521 includes a first transistor 5211 and a second transistor 5212. Each of the first transistor 5211 and the second transistor 5212 has a gate, a source, and a drain. In one embodiment, the first transistor 5211 is a N-type MOSFET, and the second transistor 5212 is a P-type MOSFET. The gate of the first transistor 5211 is coupled to the drain of the first transistor 5211, the source of the first transistor 5211 is coupled to the source of the second transistor 5212. The gate of the second transistor 5212 is coupled to the output node of the switch 10, the drain of the second transistor 5212 is coupled to the first node of the clamping switch 522. In one embodiment as shown in FIG. 4, the N-type MOSFET 5211 is equivalent to a resistor having a resistance of $1/g_m$, where $g_m$ is the transconductance of the N-type MOSFET 5211, and the P-type MOSFET 5212 is a source follower to provide a source voltage according to its gate voltage.

Figure 5:
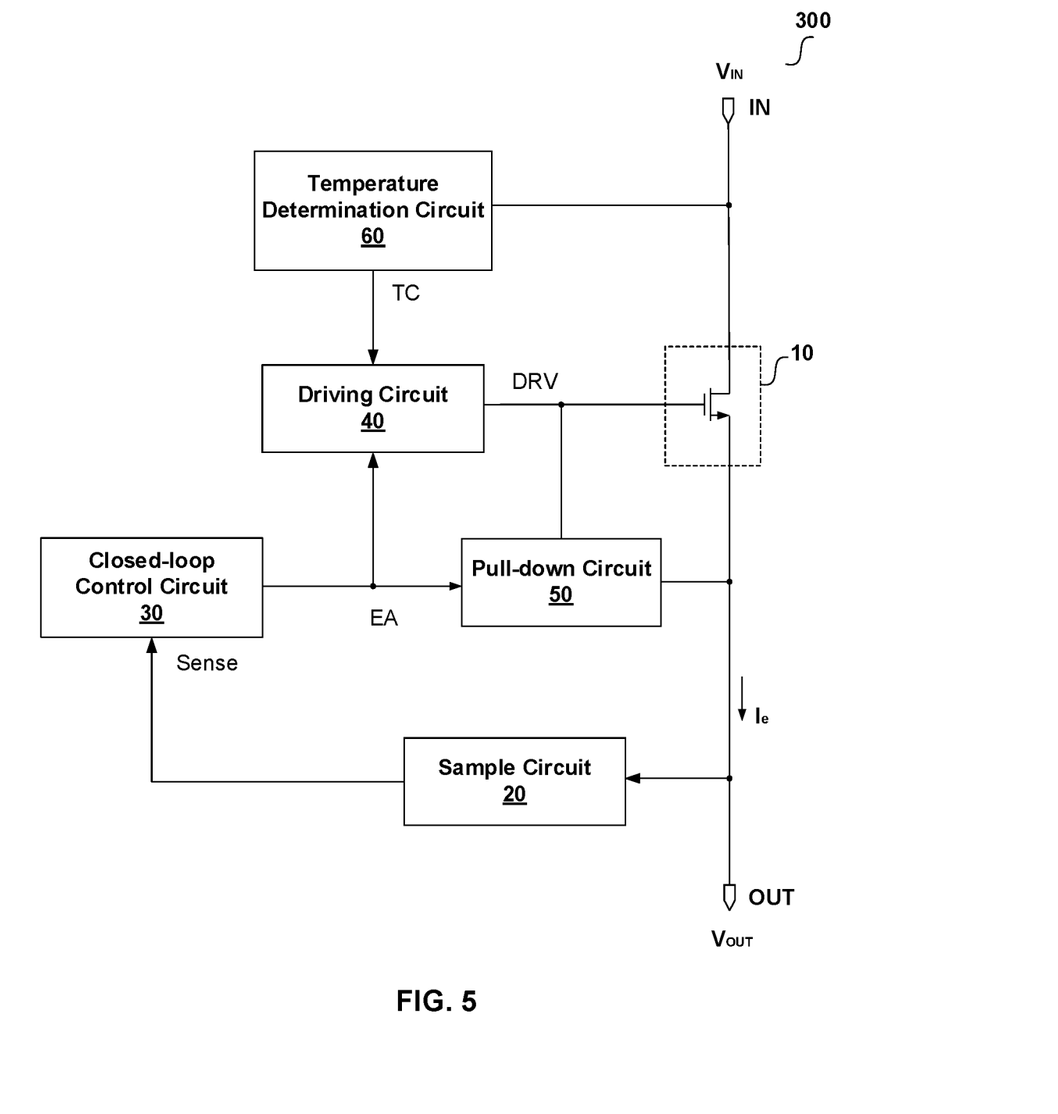
FIG. 5 is a schematic block diagram of an efuse circuit 300 according to another embodiment of the present invention.

FIG. 5 is a schematic block diagram of an efuse circuit 300 according to another embodiment of the present invention. Compared to the efuse circuit 200 as shown in FIG. 2, the efuse circuit 300 further includes a temperature determination circuit 60. The temperature determination circuit 60 is configured to indicate whether the temperature of the switching converter or the temperature of the switch 10 is greater than a preset temperature, and generate a temperature indication signal TC (e.g., an over-temperature signal indicating the temperature is greater than the preset temperature). In one embodiment as shown in FIG. 5, the driving circuit 40 is configured to generate the driving signal DRV based on the temperature indication signal TC and the error signal EA. In one embodiment, when the temperature indication signal TC indicates that the temperature is greater than the preset temperature, the driving signal DRV turns off the switch 10.

Figure 6:
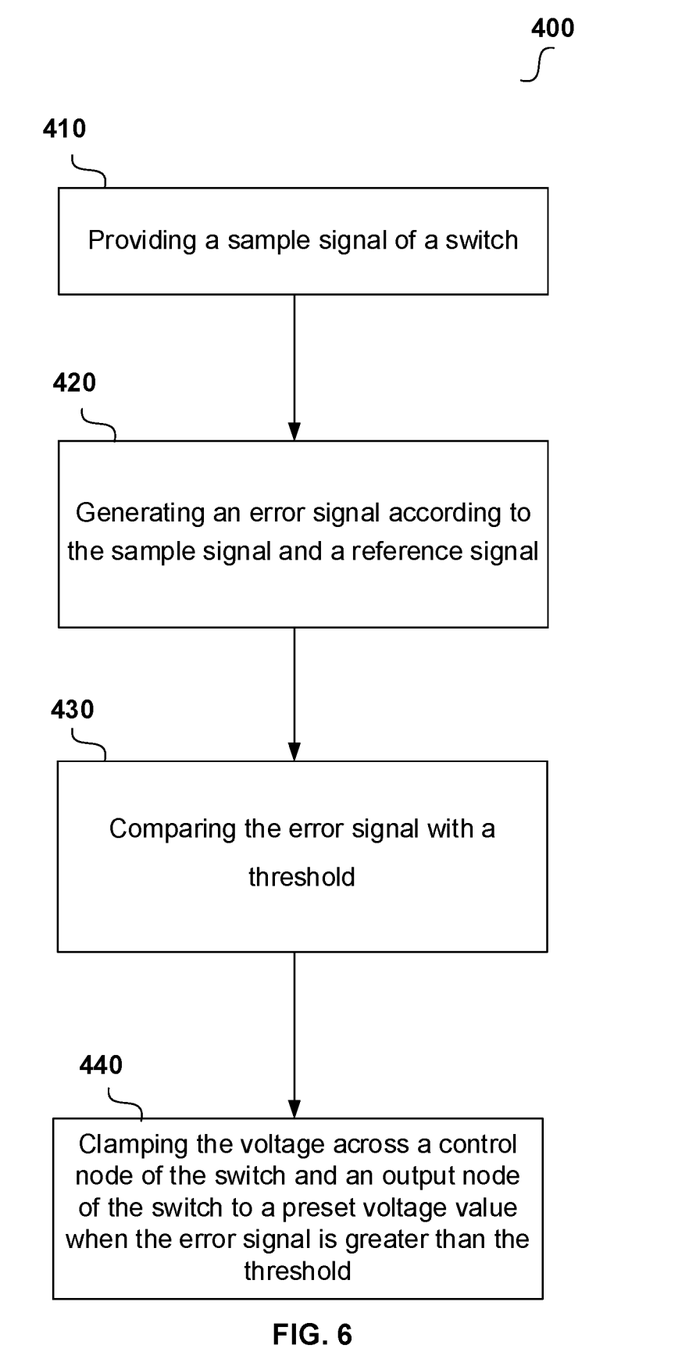
FIG. 6 is a flowchart of a method 400 for controlling an efuse circuit in accordance with one embodiment of the present invention.

FIG. 6 is a flowchart of a method 400 for controlling an efuse circuit in accordance with one embodiment of the present invention. The method 400 for controlling an efuse circuit as shown in FIG. 6 may be applied to efuse circuits of FIGS. 2, 4-5, and could be applied to other efuse circuits proposed in the present invention. In one embodiment as shown in FIG. 6, the method 400 for controlling an efuse circuit includes steps 410-440.

In step 410, a sample signal of a switch 10 (e.g., a current signal or a voltage signal) is provided. In one embodiment, the step 410 includes sampling the current flowing through the switch 10 to generate the sample signal representing the current flowing through the switch 10. In another embodiment, the step 410 includes sampling the input voltage signal $V_{IN}$ of the input node of the switch 10 to generate the sample signal representing voltage signal $V_{IN}$ of the input node of the switch 10.

In step 420, an error signal is generated according to the sample signal and a reference signal. Specifically, the error signal representing the difference between the sample signal and the reference signal is generated by comparing the sample signal with a reference signal.

In step 430, the error signal is compared with a threshold. When the error signal is greater than the threshold, step 440 is performed.

In step 440, a voltage across a control node of the switch and an output node of the switch is clamped to a preset voltage value according to the error signal.

In one embodiment, the preset voltage value is greater than the conduction threshold $V_{GS(TH)}$ of the switch 10. In one embodiment, the preset voltage value is an adaptive voltage value relative to the maximum allowable current Imax flowing through the switch 10. In one embodiment, the preset voltage value is the $V_{GS}$ value corresponding to the maximum allowable current Imax flows through the switch 10. In other words, when the error signal EA is greater than the threshold, the $V_{GS}$ voltage is clamped at the $V_{GS}$ value corresponding to the maximum allowable current Imax flows through the switch 10 so as to ensure that the current flowing through the switch 10 does not exceeds the maximum allowable current Imax. In one embodiment, the preset voltage value is 1.4V.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. An efuse circuit, comprising:
    a switch having an input node, an output node, and a control node;
    a sample circuit configured to provide a sample signal of the switch;
    a closed-loop control circuit configured to receive the sample signal, and generate an error signal according to the sample signal; and
    a pull-down circuit having a first node, a second node, and a third node, wherein the first node of the pull-down circuit is configured to receive the error signal, the second node of the pull-down circuit is coupled to the control node of the switch, and the third node of the pull-down circuit is coupled to the output node of the switch, and the pull-down circuit is further configured to clamp a voltage across the control node of the switch and the output node of the switch to a preset voltage value when the error signal is greater than a threshold.

2. The efuse circuit of claim 1, wherein the pull-down circuit is further configured to provide a conduction path from the control node of the switch to the output node of the switch, and adjust a current flowing through the control node of the switch to the output node of the switch based on the error signal when the error signal is greater than the threshold.

3. The efuse circuit of claim 1, wherein the preset voltage value is greater than a conduction threshold of the switch.

4. The efuse circuit of claim 1, wherein the preset voltage value is an adaptive voltage value relative to a maximum allowable current flowing through the switch.

5. The efuse circuit of claim 1, wherein the preset voltage value is the value of the voltage across the control node of the switch and the output node of the switch corresponding to a maximum allowable current flows through the switch.

6. The efuse circuit of claim 1, wherein the pull-down circuit comprises:
    a determination circuit configured to receive the error signal, compare the error signal with the threshold, and enable a pull-down signal when the error signal is greater than the threshold; and
    an adaptive clamping circuit having a first node, a second node, a third node, and a fourth node, wherein the first node of the adaptive clamping circuit is configured to receive the pull-down signal, the second node of the adaptive clamping circuit is configured to receive the error signal, the third node of the adaptive clamping circuit is coupled to the control node of the switch, and the fourth node of the adaptive clamping circuit is coupled to the output node of the switch;

wherein when the pull-down signal is enabled, the adaptive clamping circuit is configured to regulate the current flowing through the control node of the switch to the output node of the switch based on the error signal.

7. The efuse circuit of claim 6, wherein the adaptive clamping circuit comprises:
a preset voltage generation circuit having a first node, a second node, and a third node, wherein the first node of the preset voltage generation circuit is coupled to the control node of the switch, and the second node of the preset voltage generation circuit is coupled to the output node of the switch;
a clamping switch having a first node, a second node, and a control node, wherein the first node of the clamping switch is coupled to the third node of the preset voltage generation circuit, and the control node of the clamping switch is configured to receive the pull-down signal;
a first current mirror circuit having a first node, a second node, and a third node, wherein the first node of the first current mirror circuit is coupled to the control node of the switch, and the third node of the first current mirror circuit is coupled to the first node of the clamping switch;
a second current mirror circuit having a first node, a second node, and a third node, where the first node of the second current mirror circuit is coupled to the control node of the switch 10, the second node of the second current mirror circuit is coupled to the second node of the clamping switch, and the third node of the second current mirror circuit is coupled to the logic ground; and
a controllable current source having a first node, a second node, and a control node, wherein the first node of the controllable current source is coupled to the second node of first current mirror circuit, the second node of the controllable current source is coupled to the logic ground, and the control node of the controllable current source is configured to receive the error signal.

8. The efuse circuit of claim 7, wherein the preset voltage generation circuit comprises:
a first transistor having a first node, a second node, and a control node, wherein the first node of first transistor is coupled to the control node of the first transistor and the control node of the switch; and
a second transistor having a first node, a second node, and a control node, wherein the first node of the second transistor is coupled to the first node of clamping switch, the second node of the second transistor is coupled to the second node of the first transistor, the control node of the second transistor is coupled to the output node of the switch.

9. The efuse circuit of claim 1, wherein the sample signal is provided by sampling a current flowing through the switch.

10. The efuse circuit of claim 1, wherein the sample signal is provided by sampling an input voltage received on the input node of the switch.

11. The efuse circuit of claim 1, further comprising:
a switching converter coupled to the switch;
a temperature determination circuit configured to indicate whether a temperature of the switching converter is greater than a preset temperature;
wherein when the temperature of the switching converter is greater than the preset temperature, the switch is turned off.

12. A method for controlling an efuse circuit, comprising:
providing a sample signal of a switch;
generating an error signal according to the sample signal and a reference signal;
comparing the error signal with a threshold; and
clamping a voltage across a control node of the switch and an output node of the switch to a preset voltage value when the error signal is greater than the threshold.

13. The method of claim 12, wherein the voltage across the control node of the switch and the output node of the switch is clamped to the preset voltage value by providing a conduction path from the control node of the switch to the output node of the switch when the error signal is greater than the threshold.

14. The method of claim 12, wherein the preset voltage value is greater than a conduction threshold of the switch.

15. The method of claim 12, wherein the preset voltage value is an adaptive voltage value relative to a maximum allowable current flowing through the switch.

16. The method of claim 12, wherein the preset voltage value is the value of the voltage across the control node of the switch and the output node of the switch corresponding to a maximum allowable current flows through the switch.

17. The method of claim 12, further comprises:
enabling a pull-down signal when the error signal is greater than the threshold; and
regulating the current flowing through the control node of the switch to the output node of the switch based on the error signal when the pull-down signal is enabled.

18. The method of claim 12, wherein the sample signal is provided by sampling a current flowing through the switch.

19. The method of claim 12, wherein the sample signal is provided by sampling an input voltage signal received on the input node of the switch.

20. The method of claim 12, further comprising:
indicating whether a temperature of a switching converter is greater than a preset temperature;
turning off the switch when the temperature of the switching converter is greater than the preset temperature.

* * * * *